Oct. 13, 1936.   M. J. FINNEGAN   2,057,517
DRIVING MECHANISM FOR AIRCRAFT PARTS
Filed Sept. 27, 1934   2 Sheets-Sheet 1
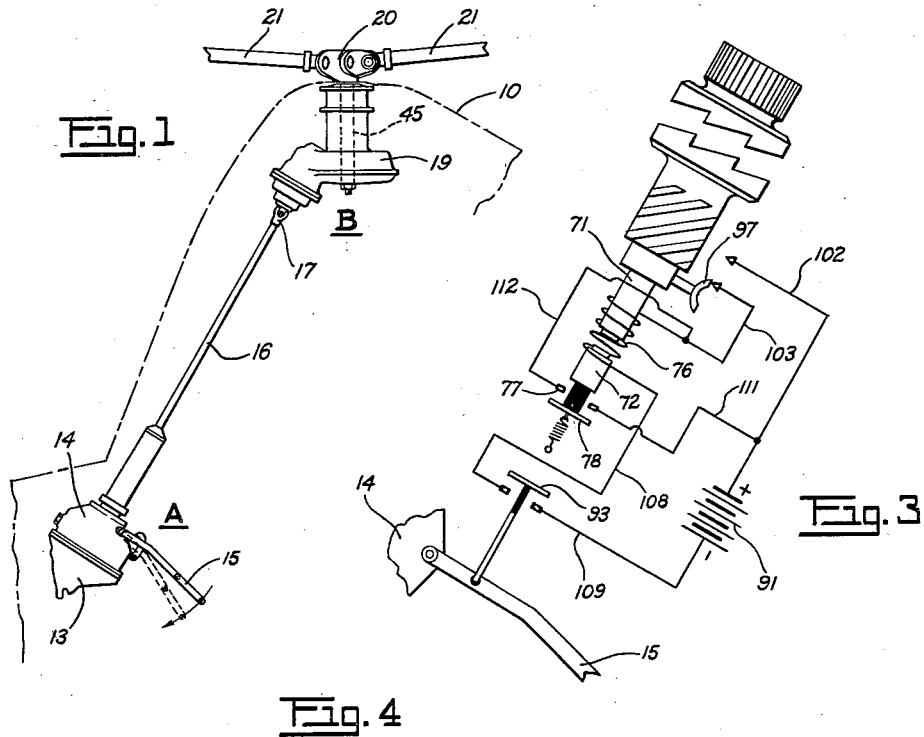
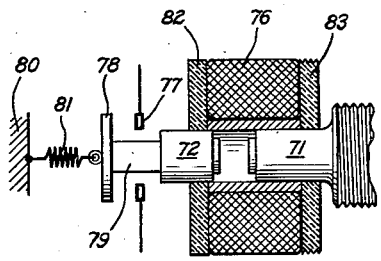
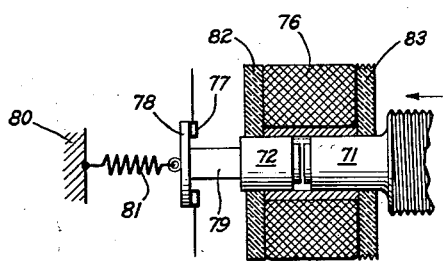

Oct. 13, 1936.    M. J. FINNEGAN    2,057,517
DRIVING MECHANISM FOR AIRCRAFT PARTS
Filed Sept. 27, 1934    2 Sheets-Sheet 2

INVENTOR.
Martin J. Finnegan
BY
ATTORNEY

Patented Oct. 13, 1936

2,057,517

UNITED STATES PATENT OFFICE 2,057,517

DRIVING MECHANISM FOR AIRCRAFT PARTS

Martin J. Finnegan, New York, N. Y., assignor to Eclipse Aviation Corporation, East Orange, N. J., a corporation of New Jersey Application September 27, 1934, Serial No. 745,787

8 Claims. (Cl. 192—48)

This invention relates to aircraft and particularly to aircraft of the type having freely rotative sustaining wings normally driven in flight by the action of the relative wind. In such an aircraft the rotative wing system, as explained in the specification of the Rawson Patent No. 1,921,839, usually consists of a plurality of wings or blades attached to a central hub mounted for free rotation, the whole system of wings and hub being hereinafter referred to as a rotor. An aircraft of this type will also be provided with forward propelling means usually consisting of an engine and airscrew, the rotor being rotated in normal flight by aerodynamic forces alone. Before the aircraft can take flight it is necessary to impart to the rotor a certain degree of initial rotation.

In the Rawson patent above identified, mechanism is disclosed for disconnecting the drive between the engine and the rotor as a condition precedent to the take-off of the craft, such mechanism being in the nature of a safety device connecting with the running wheels of the craft and adapted to defeat any attempt to take the machine off the ground with the drive from the engine to the rotor still engaged. The present invention is directed to the same ultimate objective although in a broader aspect, it is applicable to any driving mechanism, such as that of the Lansing Patent No. 1,962,397, granted June 12, 1934. It arrives at this same ultimate result by the employment of new and improved means differing radically from the means disclosed in the said Rawson patent, one of the principal differences being that the drive is rendered ineffective automatically when the rotating blades attain a speed of rotation greater than the speed of the driving means, and thereafter the drive remains continuously disconnected regardless of any action or lack of action on the part of the operator; and by virtue of the automatic operation of parts intimately associated with the rotor drive itself, in contra-distinction to the employment of extraneous means such as the running gear, or brakes therefor, as in the Rawson patent.

The nature of the present invention will be more fully understood from the following description referring to the accompanying drawings which illustrate the preferred constructional embodiment thereof in an aircraft having a freely rotatable sustaining rotor of the type referred to.

In the drawings—

Figure 1 is a fragmentary side view of portions of an aircraft of the type above referred to having the mechanism of the present invention applied thereto;

Figure 3 is a diagrammatic representation of the electrical circuits and parts involved, showing said parts in their true relation to certain of the associated mechanical parts.

Figures 4, 5 and 6 are sectional views of the clutch restraining means in the initial intermediate and restraining positions respectively.

Figure 2:
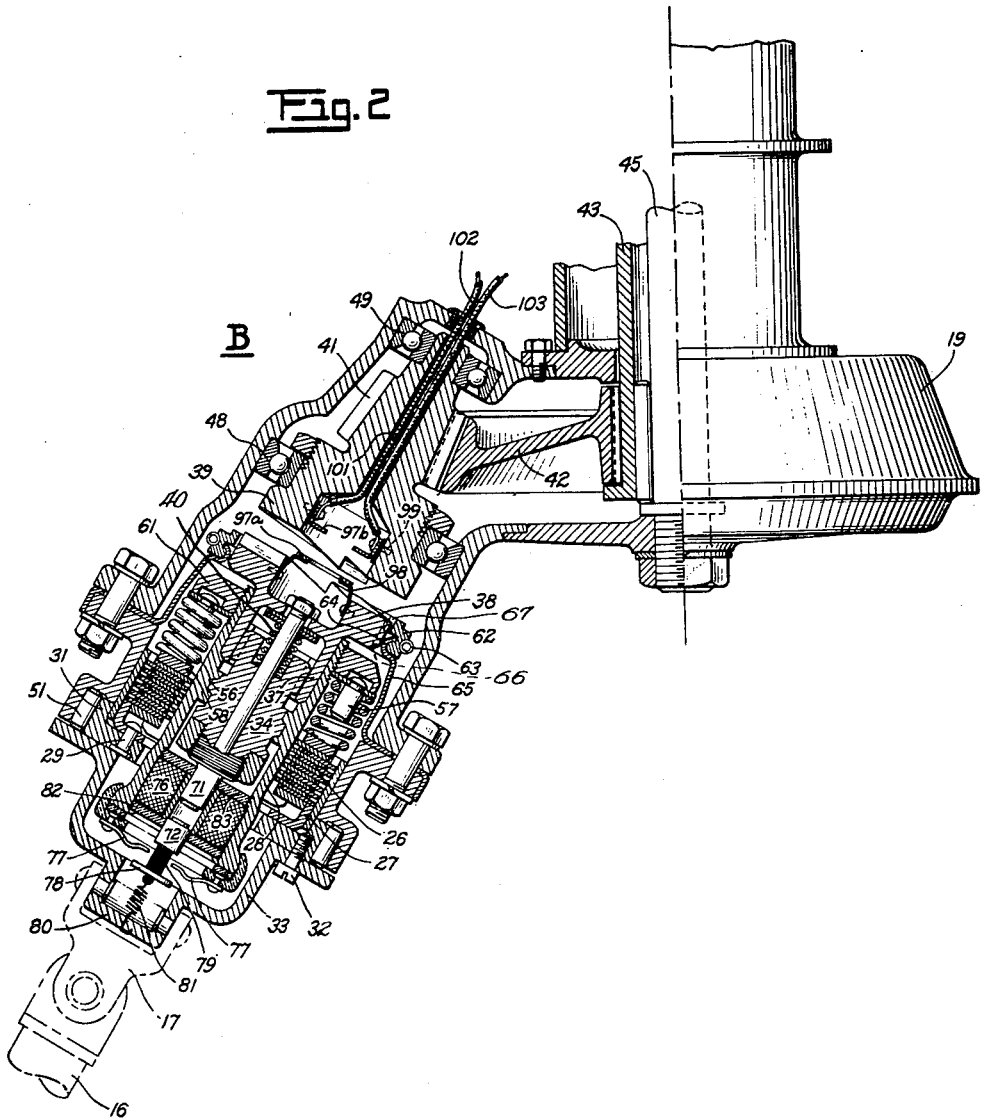
Figure 2 is a side view of certain of the upper parts of the mechanism shown in Figure 1, the view being partly in elevation and partly in vertical section.

Referring first to Figure 1, the outline of the aircraft is shown at 10 in dot and dash lines and the hub of the rotative wing assembly or rotor is shown at 20, the said hub including a downwardly extended axis member 45 mounted and supported on suitable bearings, housed in a casing 19, which in turn is secured to and supported by the structural members, not shown, of the aircraft body as in the Rawson patent above identified. The rotating wings are partially indicated at 21, the said wings being articulated with the hub 20 in the usual manner.

Also as in the Rawson patent, the means for imparting initial rotation to the rotor 20, before taking flight, comprises lower and upper transmission units, generally indicated at A and B, interconnected by an oblique shaft 16. The lower transmission unit A preferably includes a reduction gear taking power from the crankshaft or one of the auxiliary drive shafts of the engine 13 and a friction clutch 14. These components are not shown in the drawings, but they are contained within a casing bolted to the engine part 13, as shown. The friction clutch is engageable and disengageable by means of a hand lever 15.

The upper transmission unit B, which is more particularly illustrated in Figure 2, is housed within the casing 19 and receives the drive from the lower transmission unit A by means of the oblique shaft 16, and a universal joint 17.

In the present invention this upper transmission unit differs in construction from that of the corresponding unit of the Rawson disclosure in that it employs an automatically engaging and disengaging clutch of the inclined surface tooth type together with a pre-set torque limit clutch similar to that used in the engine starter of the Lansing patent above identified, to which use the present invention is also applicable, as will be more evident as the present description progresses. As shown, this clutch assembly includes a set of friction disks 26 splined alternately to a driving shell 27 and an internally threaded sleeve 28, the said shell being rigidly connected as by the rivets 29, plate 31 and screws 32, to the cup-shaped member 33 which receives the drive from the universal joint 17 in the manner clearly indicated in Figure 2. The sleeve 28 receives a correspondingly threaded shaft 34 which is splined at its forward end to engage corresponding splines in the rearwardly extending portion 37 of the clutch element 38, the said clutch element being adapted to move forward into engagement with the corresponding clutch element 39 in response to the pressure which spring 40 yieldingly exerts thereupon in an axial direction as the shaft 34 is screwed forwardly in response to rotation of the driving members 33, 27, 26 and 28.

The clutch element 39 is shown as having an extending portion in the form of a pinion 41 adapted to mesh with a gear 42 which in turn is splined or otherwise suitably connected to a sleeve 43 constituting the driving means for the rotor 20. Suitable bearings 48 and 49 are mounted in recesses in the housing 19 and rotatably support the combined gear and clutch element 39, 41. Bearing means 51 are also provided to rotatably support the section 31 of the driving assembly and if desired additional bearing means may be provided to facilitate free rotation of the shell 27. Coil springs 56 mounted on studs 57 engage a pressure plate 58 to exert a pressure thereupon, the amount of which is variable according to the setting of the spring retaining nut 61 which threadedly engages the outer end of the threaded sleeve 28. Preferably a sectional ring 62 and a coil spring 63 cooperate with the annular groove 64 formed at one end of the oil guard 65, their purpose being to exert a yielding restraint upon the clutch element 38 and thereby facilitate forward movement thereof in response to the screw action of the parts 28 and 34, the yielding restrain being a restraint upon rotation during such forward movement, as illustrated and explained in greater detail in the Lansing patent above identified. To permit this axial advance of the member 38, with relation to the non-advancing sectional ring 62, said parts have interengaging splines 66 and 67, corresponding to the interengaging splines 55 and 56 of the said Lansing patent.

Having now described the parts constituting the means for transmitting the drive from the power plant of the craft to the wing actuating assembly or rotor 20, the novel means of the present invention, whereby the transmission of torque is automatically stopped and maintained in operation will now be described. As shown in Figures 2 and 3, such control means includes an electromagnetic device preferably of the solenoid type, wherein there are two slidable magnetizable plungers or cores 71 and 72, the former being shown as constituted by an integral extension of the screw shaft 34 and the latter being a part of a switch assembly consisting of a pair of relatively fixed contacts 77 and a bridging contact 78 secured to the plunger 72 but insulated therefrom as indicated at 79. A tension spring 81 opposes the magnetizing effect of the winding 76 of the solenoid, the said spring being secured to the element 80 of the universal joint 17, the end plates 82 and 83 of the solenoid being secured to the sleeve 28 so that all parts of the solenoid device including the coil and plungers rotate in unison with the drive transmitting parts. Since this rotation is unitary it has no effect upon the magnetizing action of the winding 76 with respect to the plungers 71 and 72, the arrangement being such that the action is the same as it would be with all these parts held against any rotation whatever. As shown in Figure 4, and also in Figure 2, the plunger 71 remains fully within the boundaries of the solenoid under normal conditions—that is, with no current passing through the winding 76—while the plunger 72 is held normally in the withdrawn position by reason of the pull exerted by spring 81. Upon energization of the winding 76 the plunger 72 is, of course, drawn inwardly into the position shown in Figures 5 and 6, in which position the switch 77, 78 is closed. Energization of the winding 76 also tends to retain the plunger 71 in the innermost position as shown in Figures 2, 4, and 6, but prior to such energization of the winding 76 the said plunger is withdrawn by the screw action occurring between the parts 28 and 34 which action occurs in response to initial rotation of the driving means.

The means for energizing the winding 76 after the plunger 71 has been withdrawn from the position indicated in Figures 2 and 4 to the position indicated in Figure 5, includes a suitable source 91 and a circuit from said source to the winding 76, the said circuit having two normally open switches in series relation, one switch 93 being linked to the clutch operating arm 15, so that upon closure of the said clutch the switch 93 is moved to the closed position and remains closed until subsequent disengagement of the clutch by action of the operator. The second switch, shown diagrammatically at 97, in Figure 3, is preferably in the form indicated in Figure 2 wherein it is shown consisting of a pair of annular current conducting elements 97a and 97b, the former being attached by suitable non-conducting means 98 to the clutch element 38 and the latter being secured by similar means 99 to the clutch element 39, the latter being centrally bored as indicated at 101 to permit insertion of the leads 102 and 103.

From the foregoing explanation it will be evident, assuming the power plant of the engine to be in rotation for the purpose of conditioning the craft for take-off, the operator will actuate the clutch 14 through the actuating means 15 and thereby cause rotation of the shaft 16. This initial rotation of the shaft 16 and the parts 17, 33, 31, 27, and 26 connected therewith, and the resulting initial rotation of the sleeve 28, in conjunction with the frictional restraint against rotation exerted upon the clutch element 38, will cause the shaft 34 to be screwed forwardly and will also cause the corresponding forward movement of the clutch element 38 into driving engagement with the clutch element 39. In this manner rotation will also be imparted to the wings 21 through the driving connections 41, 42, 43 and 45, and by this action the said wings will be accelerated to a speed which will make them more readily susceptible to sustain rotation by action of the wind pressure of the air currents in the wake of the propeller of the craft.

In moving to the engaged position the clutch element 38 causes the switch 97 to be closed, as above explained, and since the switch 93 has been previously closed by reason of the engagement of the clutch 14, a circuit is now established to energize the solenoid winding 76, such circuit passing from the source 91 to the winding 76 by way of the connections 102, 97, and 103, the current returning to the source by way of conductors 108, switch 93 and conductor 109. The magnetic field produced by such energization draws the plunger 72 into the position indicated in Figures 5 and 6, thereby establishing a self-holding shunt circuit for the winding 76 so that said winding may remain energized independently of the condition of the switch 97, the shunt circuit passing by way of conductor 111 to the switch contacts 77 and 78 and from said contacts to the winding 76 by way of conductor 112.

The magnetic field produced by energization of the winding 76 also tends to contract the plunger 71 from the position shown in Figure 5 (to which position it has been moved by the clutch engaging action of the screw shaft 34 as above described) to the inner position shown in Figure 6; but so long as the transmission of torque through the elements 34 and 38 to the driven element 39 continues, the resulting force exerted upon the element 34 to hold it in the clutch engaging position is stronger than the magnetic attraction set up by the winding 76 upon the plunger 71, and the latter therefore remains in the outer position until the combined effect of the mechanical acceleration of the rotor 20 plus the wind pressure of the wings, eventually causes the said rotor and the parts connected therewith to exceed the speed of the driving clutch element 38. When this occurs the clutch element 39 overruns the clutch element 38 and the inclined faces of said elements, in conjunction with the reverse screw action of the parts 34 and 28 causes the shaft 34 and the clutch element 38 to return to the inoperative position indicated in Figure 2, and there is, of course, a corresponding return of the plunger 71 to the inner position, as shown in Figures 2, 4, and 6. When thus returned the magnetic field becomes sufficiently effective— the coil 76 being still energized and remaining so as long as the operator delays or neglects to reopen the clutch 14. In this manner the plunger 71, and therefore the screw shaft 34 and the clutch element 38, are held against any further axial movement such as would inevitably result in an attempted re-engagement of the elements 38 and 39 and a corresponding injury to the clutch teeth. In screw control clutches of this character such tendency to remesh continues to occur so long as the driving shaft 16 remains energized, or in other words, until it occurs to the operator that it is now time to reopen the clutch 14. When the operator eventually performs this clutch disengaging operation the circuit to the coil 76 is broken by reason of the opening of the contacts 93 which move with the clutch disengaging member 15. When thus de-energized the coil 76 is no longer sufficient in itself to retain either the plunger 71 or 72 in the inner position, but the plunger 71 nevertheless remains in such position since the transmission of torque through the shaft 16 to the screw shaft 34 has now ceased and therefore there is no further tendency of said screw shaft to move forward axially nor is there any further tendency of the clutch elements 38 and 39 to reengage.

From the foregoing it is apparent that no matter how long the operator delays the disengagement of the clutch 14 such delay will not operate to produce an undesirable tendency to remesh the clutch elements 38 and 39, once said elements have been disengaged by the overrunning action which occurs when the rotor 20 has reached a speed in excess of that of the driving shaft 16.

For claims to the invention, considered independently of the clutch 15, and of any means for producing automatic engagement in the first instance, reference is to be had to my co-pending (divisional) application filed September 14, 1936, Serial Number 100,741, and disclosing this same embodiment of the invention.

What is claimed is:

1. In a driving mechanism for aircraft wing rotors, the combination with a pair of normally disengaged clutches of means responsive to engagement of one of said clutches to produce automatic engagement of the second clutch, and electro-magnetic means responsive to overrunning of one part of the second clutch with respect to the other to maintain said parts of said second clutch disengaged one from the other notwithstanding the continued tendency of said first-named means to produce re-engagement of said parts.

2. In a driving mechanism for aircraft wing rotors, the combination with a pair of normally disengaged clutches of means responsive to engagement of one of said clutches to produce automatic engagement of the second clutch, and electro-magnetic means responsive to overrunning of one part of the second clutch with respect to the other to maintain said second clutch disengaged notwithstanding the continued tendency of said first-named means to produce re-engagement of said parts and means responsive to disengagement of said first clutch to produce deenergization of said maintaining means.

3. In a driving mechanism for aircraft wing rotors, the combination with a pair of normally disengaged clutches of means responsive to engagement of one of said clutches to produce automatic engagement of the second clutch, and means responsive to any overrun, even though only temporary, of one part of said second clutch with respect to another part thereof to maintain said parts disengaged notwithstanding the continued tendency of said first-named means to produce reengagement of said parts.

4. In a driving mechanism for aircraft wing rotors, the combination with a pair of normally disengaged clutches of means responsive to engagement of one of said clutches to produce automatic engagement of the second clutch, and means responsive to overrunning of one part of said second clutch with respect to another part to maintain said parts disengaged notwithstanding the continued tendency of said first-named means to produce re-engagement of said parts and means responsive to disengagement of said first clutch to produce de-energization of said maintaining means.

5. In a driving mechanism, the combination with a pair of normally disengaged clutches of means responsive to engagement of one of said clutches to produce automatic engagement of the second clutch, and electro-magnetic means responsive to overrunning of one part of the second clutch with respect to another part thereof to maintain said parts disengaged notwithstanding the continued tendency of said first-named means to produce re-engagement of said parts.

6. In a driving mechanism, the combination with a pair of normally disengaged clutches of means responsive to engagement of one of said clutches to produce automatic engagement of the second clutch, electro-magnetic means responsive to overrunning of one part of the second clutch with respect to another part thereof to maintain said parts disengaged notwithstanding the continued tendency of said first-named means to produce re-engagement of said parts, and means responsive to disengagement of said first clutch to produce de-energization of said maintaining means.

7. In a driving mechanism, the combination with a normally disengaged clutch and a driving member, of means responsive to operation of said driving member to produce automatic engagement of said clutch, and means responsive to any overrun, even though only temporary, of part of the said clutch with respect to another part thereof to maintain said parts disengaged notwithstanding the continued tendency of said driving member to produce re-engagement of said parts.

8. In a driving mechanism, the combination with a pair of normally disengaged clutches of means responsive to engagement of one of said clutches to produce automatic engagement of the second clutch, means responsive to overrunning of part of the said clutch with respect to another part thereof to maintain said parts disengaged notwithstanding the continued tendency of said first-named means to produce re-engagement of said parts, and means responsive to disengagement of said first clutch to produce de-energization of said maintaining means.

MARTIN J. FINNEGAN.